(12) United States Patent
Loreti

(10) Patent No.: US 11,448,089 B2
(45) Date of Patent: Sep. 20, 2022

(54) DETECTING DAMAGE TO A GAS TURBINE ENGINE

(71) Applicant: Rolls-Royce plc, London (GB)

(72) Inventor: Stefano Loreti, Derby (GB)

(73) Assignee: ROLLS-ROYCE PLC, London (GB)

(*) Notice: Subject to any disclaimer, the term of this patent is extended or adjusted under 35 U.S.C. 154(b) by 23 days.

(21) Appl. No.: 17/160,890

(22) Filed: Jan. 28, 2021

(65) Prior Publication Data

US 2021/0317750 A1  Oct. 14, 2021

(30) Foreign Application Priority Data

Feb. 6, 2020 (GB) ..................................... 2001602

(51) Int. Cl.
  *F01D 21/04* (2006.01)
  *B64D 27/10* (2006.01)
  (Continued)

(52) U.S. Cl.
  CPC ............. *F01D 21/04* (2013.01); *B64D 27/10* (2013.01); *F02C 7/36* (2013.01);
  (Continued)

(58) Field of Classification Search
  CPC .......... F01D 21/04; F01D 17/06; F01D 25/34; F01D 21/045; F05D 2270/096;
  (Continued)

(56) References Cited

U.S. PATENT DOCUMENTS 5,622,045 A    4/1997  Weimer et al.
6,499,350 B1*  12/2002 Board .................... G01H 1/006
                                               73/660
(Continued)

FOREIGN PATENT DOCUMENTS

CN    108661945 A    10/2018
EP      1312766 A2    5/2003
(Continued)

OTHER PUBLICATIONS

"Mean Value Theorem for Integrals", Jan. 22, 2020, www.calcworkshop.com/integrals/mean-value-theorem-for-integrals, pp. 1-3 Date accessed Apr. 14, 2022 (Year: 2020).*
(Continued)

*Primary Examiner* — Woody A Lee, Jr.
*Assistant Examiner* — Eric A Lange
(74) *Attorney, Agent, or Firm* — Oliff PLC

(57) ABSTRACT

A computer implemented method for detecting a damage to a gas turbine engine. The gas turbine engine includes a fan and a plurality of turbine stages including a low pressure turbine stage. The fan is drivably coupled to the low pressure turbine stage. The method includes receiving a first signal indicative of a speed of rotation of the fan. The method further includes receiving a second signal indicative of a speed of rotation of the low pressure turbine stage. The method further includes determining a difference metric representative of a difference between the speed of rotation of the fan and the speed of rotation of the low pressure turbine stage. The method further includes determining whether a damage event has occurred based on whether the difference metric passes a threshold.

19 Claims, 12 Drawing Sheets

(51) Int. Cl.
  *F02C 7/36* (2006.01)
  *B64D 45/00* (2006.01)
(52) U.S. Cl.
  CPC .............. *B64D 2045/0085* (2013.01); *F05D 2220/323* (2013.01); *F05D 2260/4031* (2013.01); *F05D 2260/80* (2013.01); *F05D 2270/09* (2013.01); *F05D 2270/304* (2013.01)
(58) Field of Classification Search
  CPC ......... F05D 2270/702; F05D 2270/703; F05D 2220/323; F05D 2260/4031; F05D 2260/80; F05D 2270/09; F05D 2270/304; F05D 2270/80; F02C 9/00; F02C 7/36; B64D 27/10; B64D 2045/0085; Y02T 50/60
  See application file for complete search history.

(56) References Cited

U.S. PATENT DOCUMENTS

| | | | |
|---|---|---|---|
| 6,625,987 B2 * | 9/2003 | Pisano | F01D 21/14 |
| | | | 60/773 |
| 7,963,745 B1 | 6/2011 | Liang | |
| 8,197,211 B1 | 6/2012 | Liang | |
| 2010/0266415 A1 | 10/2010 | Viens et al. | |
| 2014/0236450 A1 * | 8/2014 | Care | F01D 5/027 |
| | | | 701/100 |
| 2016/0194977 A1 | 7/2016 | MacDonald | |
| 2016/0222806 A1 | 8/2016 | Jennings | |
| 2017/0356302 A1 * | 12/2017 | Descamps | F02C 7/262 |
| 2018/0051587 A1 * | 2/2018 | Fletcher | F02C 3/00 |
| 2018/0073519 A1 | 3/2018 | Welch | |
| 2018/0135455 A1 * | 5/2018 | Khibnik | F01D 21/003 |
| 2018/0163640 A1 * | 6/2018 | Dubreuil | F02C 3/10 |
| 2019/0184824 A1 * | 6/2019 | Guan | G07C 5/008 |

FOREIGN PATENT DOCUMENTS

| | | |
|---|---|---|
| EP | 3 287 629 A1 | 2/2018 |
| EP | 3287609 A1 | 2/2018 |

OTHER PUBLICATIONS

Jul. 8, 2021 extended Search Report issued in European Patent Application No. 21151474.0.

Mar. 31, 2021 extended Search Report issued in European Patent Application No. 20201248.0.

* cited by examiner

DETECTING DAMAGE TO A GAS TURBINE ENGINE

CROSS-REFERENCE TO RELATED APPLICATIONS

This application claims the benefit of priority under 35 U.S.C. 119(a) of UK Patent Application Number 2001602.8 filed on 6 Feb. 2020, the entire contents of which are incorporated herein by reference.

FIELD OF THE DISCLOSURE

The present disclosure relates to the detection of damage to gas turbine engines, particularly but not exclusively gas turbine engines of aircraft.

BACKGROUND

A gas turbine engine provided on an aircraft is susceptible to damage when birds, ice, or other foreign objects are ingested through an air intake. Damage may also be caused by domestic objects, for example if a turbine blade is lost. Various detection techniques may be used for detecting such damage events.

Some techniques use engine vibration measurements for detection, but the vibration spectrum of an engine is complex and highly sensitive to changes associated with engine manoeuvres. This can lead to spurious detections, and in some cases detection must be suppressed during manoeuvres leaving the engine exposed to undetected strikes. Other techniques make extensive use of correction parameters, look-up tables and filtering to increase robustness and reduce false detections, but this is associated with an increase in complexity and may require the use of additional sensors that would not otherwise be present in a gas turbine engine. Camera-based and acoustic-based detection methods similarly require additional sensors.

There is therefore a need for improved detection techniques that address these and/or other problems.

SUMMARY

According to a first aspect there is provided a computer-implemented method for detecting damage to a gas turbine engine having a fan and a plurality of turbine stages including a low pressure turbine stage, the fan being drivably coupled to the low pressure turbine stage. The method includes receiving a first signal indicative of a speed of rotation of the fan. The method further includes receiving a second signal indicative of a speed of rotation of the low pressure turbine stage. The method further includes determining, based on the first signal and the second signal, a difference metric. The difference metric may be representative of a difference between the speed of rotation of the fan and the speed of rotation of the low pressure turbine stage. The method further includes determining whether a damage event has occurred based on whether the difference metric passes a threshold.

Determining the difference metric may include determining a difference between the speed of rotation of the fan and the speed of rotation of the low pressure turbine stage. In this case, determining the difference metric may further include integrating the determined difference between the speed of rotation of the fan and the speed of rotation of the low pressure turbine stage.

Determining the difference metric may include time integrating the first signal indicative of the speed of rotation of the fan to produce a first integrated signal. Determining the difference metric may further include time integrating the second signal indicative of the speed of rotation of the low pressure turbine stage to produce a second integrated signal. Determining the difference metric may further include determining a difference between the first integrated signal and the second integrated signal.

The threshold may be a predetermined threshold for a gas turbine engine type corresponding to the gas turbine engine.

The threshold may be adapted based on one or more current operating conditions of the gas turbine engine.

The threshold may be adapted based on an engine history of the gas turbine engine.

The method may further include determining an approximate impact energy associated with a damage event based on a magnitude of the difference metric.

The method may further include approximating a size of an impact object associated with the damage event based on the determined impact energy.

The method may further include categorising the damage event as one of a plurality of different possible types of damage event based on the determined approximate impact energy and/or the determined approximate size of the object.

The method may further include receiving a third signal from an impact location detector indicating a location of an impact associated with a damage event. The method may further include categorising the damage event as one of a plurality of different possible types of damage event based at least in part on the location of the impact.

The method may further include categorising the damage event as one of a plurality of different possible types of damage event based on a comparison of the difference metric and a plurality of different thresholds corresponding to the different types of damage event.

The method may further include categorising the damage event as one of a plurality of different possible types of damage event based on a degree to which the difference metric passes the threshold.

The different types of damage event may include one or more foreign object damage events and/or one or more domestic object damage events.

The one or more foreign object damage events may include a bird strike.

If the difference metric does not pass the threshold, the method may further include determining whether a non-damage event has occurred based on whether the difference metric passes a second threshold.

The method may further include categorising the non-damage event as one of a plurality of types of non-damage event.

The fan may be drivably coupled to the low pressure turbine stage by a gearbox.

According to a second aspect there is provided a computer readable medium storing instructions which, when executed by one or more computers, causes the computers to perform the method according to the first aspect.

According to a third aspect, there is provided a controller for an aircraft. The controller may be configured to perform the method according to the first aspect.

According to a fourth aspect, there is provided an aircraft including a gas turbine engine having a fan and a plurality of turbine stages including a low pressure turbine stage. The fan is drivably coupled to the low pressure turbine stage. The aircraft further includes the controller according to the third aspect.

The systems and methods of the present disclosure may provide surprisingly effective, accurate detection using what is a relatively computationally simple algorithm. Look-up tables may not be required for correction of various parameters used for the detection, further reducing the complexity of the systems and method. The systems and methods may also be robust to engine manoeuvres, such as slam acceleration and deceleration. In other words, the systems and methods may not generate false or spurious detections of damage events during normal engine operation. Thus, output signals generated by the systems and methods may not require further signal processing. The systems and methods may therefore be relatively easy to implement and deploy.

Since the systems and methods are less likely to generate false triggers during transient manoeuvres of the engine, the systems and methods may also be kept operational during transient manoeuvres. Further, the systems and methods may also be able differentiate between different types of damage events as well as non-damage events. The systems and methods may not require any additional sensors and so may be implemented in existing aircrafts and gas turbine engines without further physical modifications.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above).

Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position.

The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of from 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
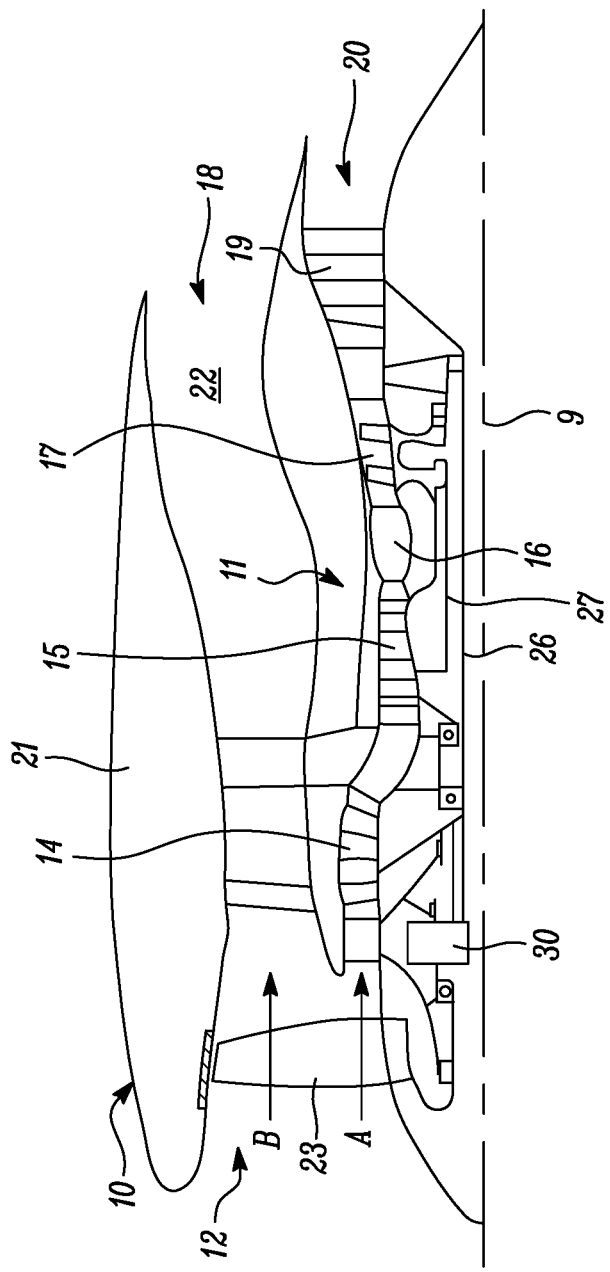
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
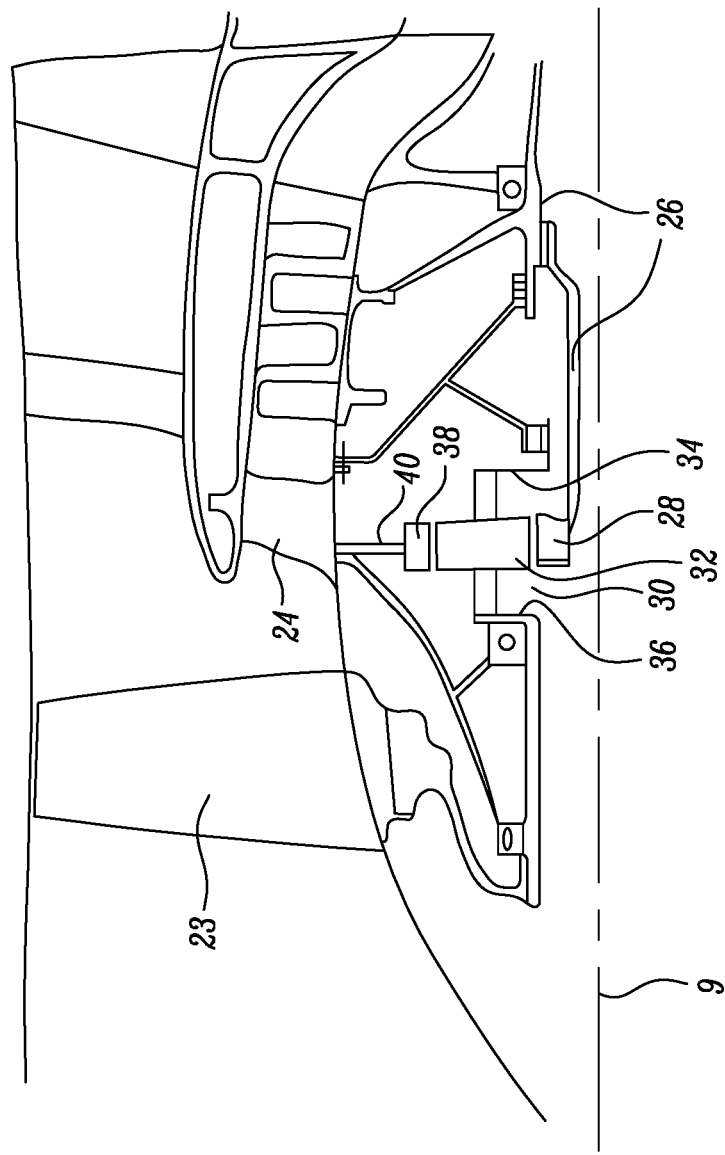
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
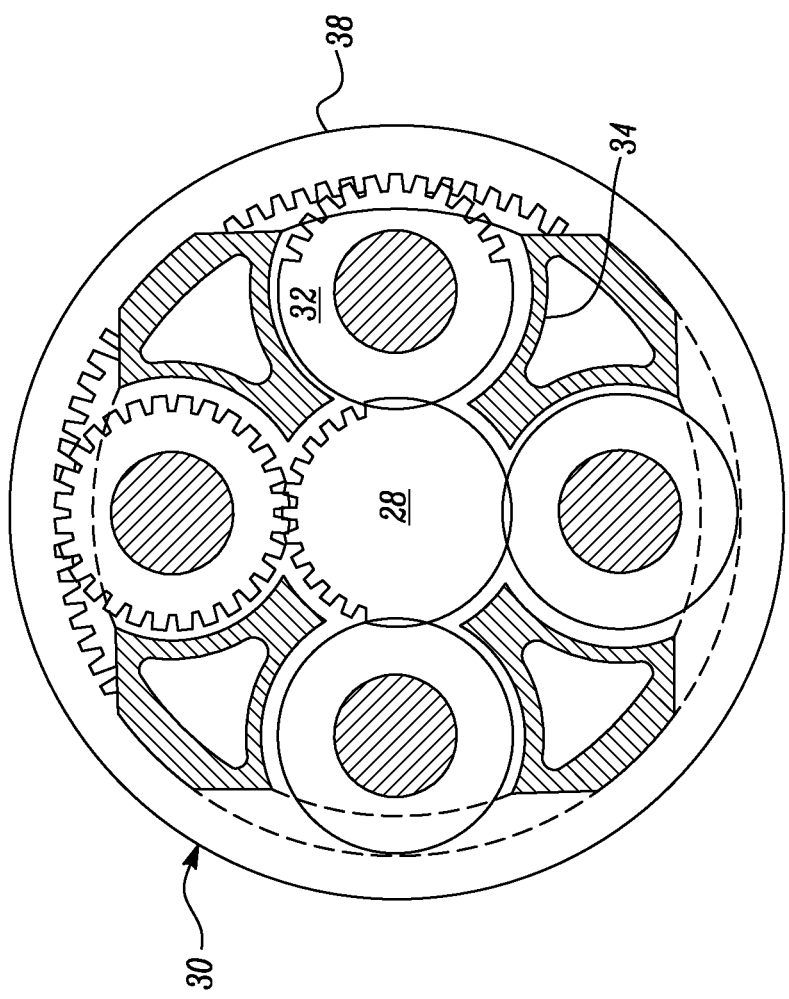
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle.

One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

In addition, the present invention is equally applicable to aero gas turbine engines, marine gas turbine engines and land-based gas turbine engines.

Figure 4A:
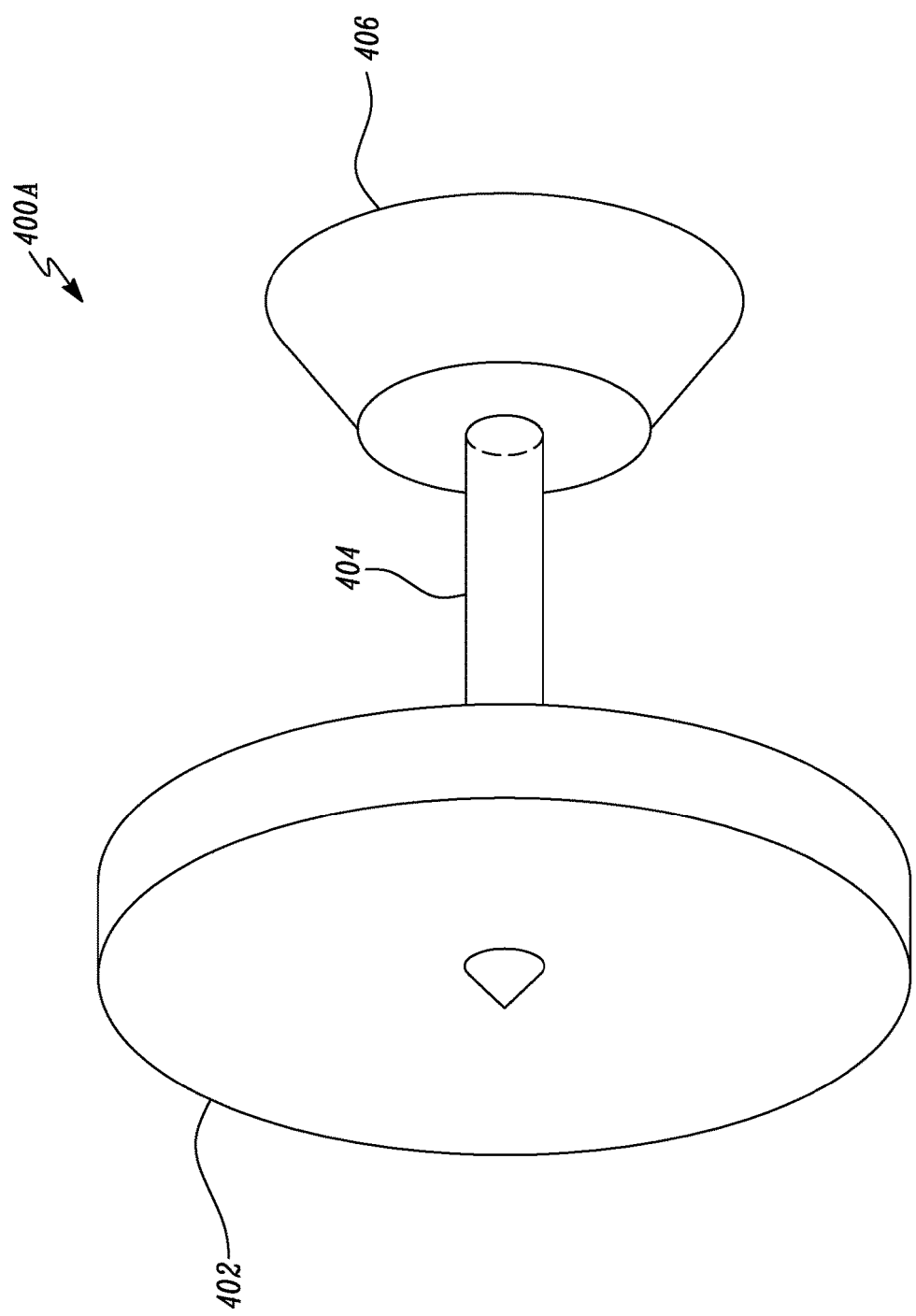
FIG. 4A is a perspective view of a fan and turbine arrangement including a shaft.

FIG. 4A is a simplified schematic view of a fan and turbine arrangement 400A of a gas turbine engine, for example, the gas turbine engine 10 of FIG. 1. The fan and turbine arrangement 400A includes a fan 402 and a low pressure turbine stage 406. The low pressure turbine stage 406 may be one of a plurality of turbine stages of the gas turbine engine 10. For example, the gas turbine engine may also include a high pressure turbine stage, and perhaps also an intermediate pressure turbine stage, upstream of the low pressure turbine stage 406. The fan 402 is drivably coupled to the low pressure turbine stage 406 by a shaft 404.

The fan and turbine arrangement 400A may be considered to be two lumped masses or inertias (i.e., the fan 402 and the low pressure turbine stage 406) with a torsional spring (i.e., the shaft 404) provided therebetween. Momentum exchanged when an object strikes the fan 402 may cause torsional oscillations of the shaft 404. Torsional oscillations of the shaft 404 may result in an abnormal difference between a speed of rotation N1 (shown in FIG. 5) of the fan 402 and a speed of rotation N1T (shown in FIG. 5) of the low pressure turbine stage 406. In accordance with this disclosure, comparison between the speed of rotation N1 of the fan 402 and the speed of rotation N1T of the low pressure turbine stage 406 may be used in detecting and possibly characterizing an event, for example a bird strike or another foreign or domestic object damage event.

Figure 4B:
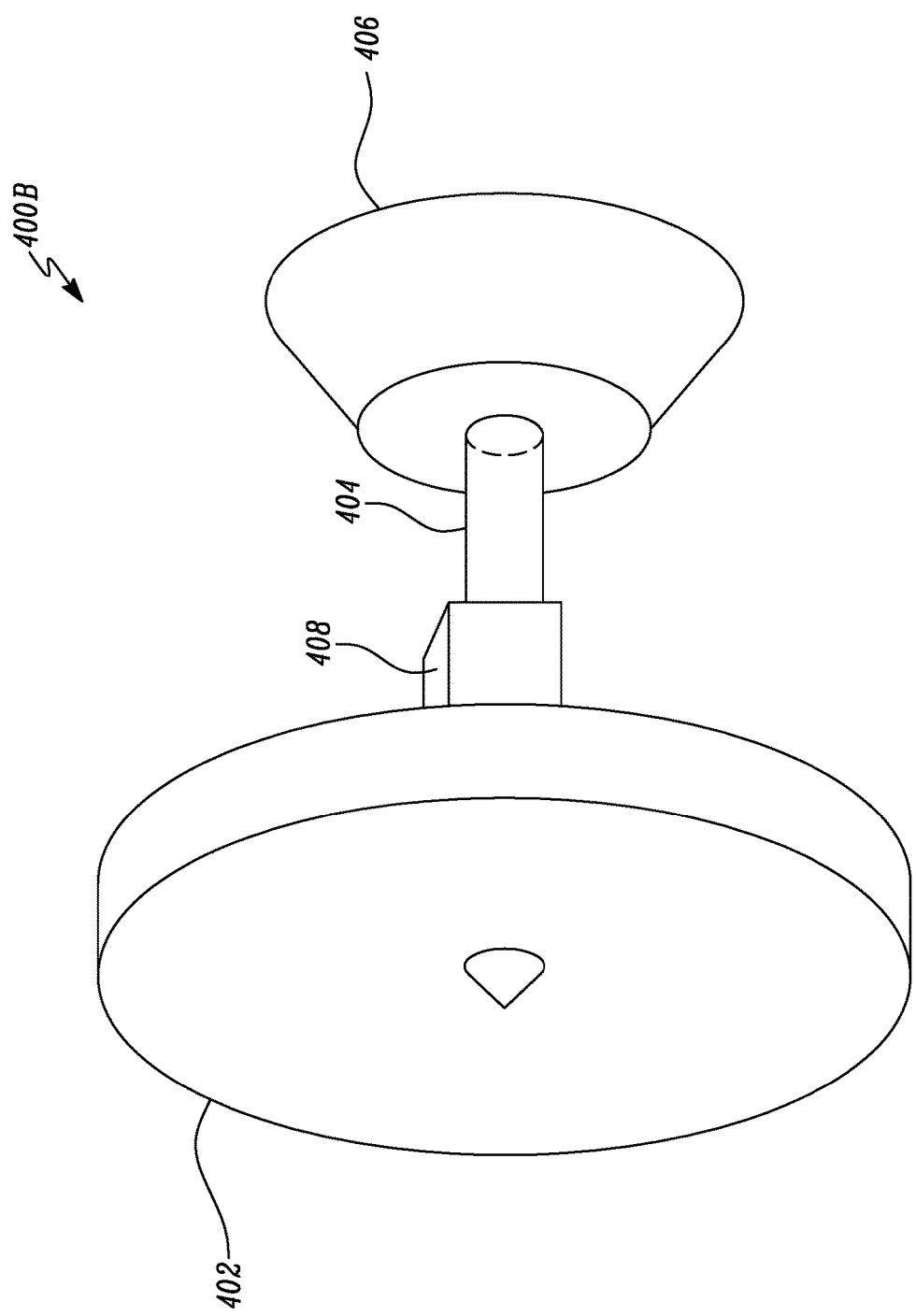
FIG. 4B is a perspective view of another fan and turbine arrangement including a gearbox.

FIG. 4B is a simplified schematic view of another fan and turbine arrangement 400B. The fan and turbine arrangement 400B is similar to the fan and turbine arrangement 400A of FIG. 4A. However, as shown in FIG. 4B, the shaft 404 drivably couples the fan 402 to the low pressure turbine stage 406 via a gearbox 408. Like the fan and turbine arrangement 400A of FIG. 4A, the fan and turbine arrangement 400B can be considered a lumped mass or inertia system with a torsional spring (i.e., the shaft 404 and gearbox 408) provided therebetween, though the gearbox may change the response of the shaft 404 to an event as compared to the arrangement 400A of FIG. 4A.

Figure 5:
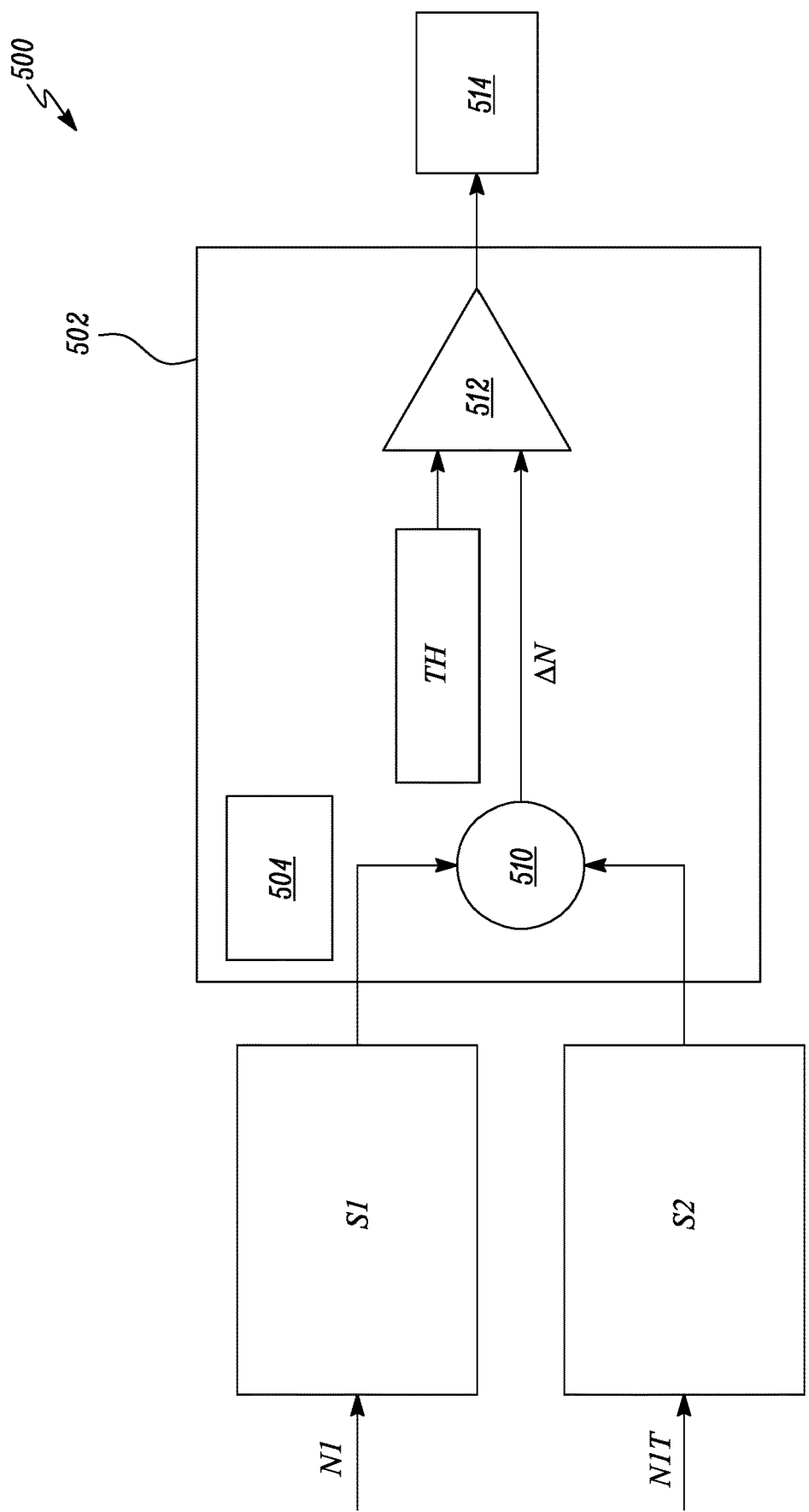
FIG. 5 is a schematic view of a system for detecting damage to a gas turbine engine.

FIG. 5 illustrates a system 500 for detecting damage to a gas turbine engine, for example, the gas turbine engine 10 of FIG. 1. The system 500 includes a controller 502 for implementing a detection algorithm. The controller 502 may, for example, include a computer readable storage medium 504 (e.g., a memory) storing instructions or code which, when executed by a processor of the controller, causes the controller to perform the detection algorithm. In this example the controller 502 includes an electronic circuit for implementing the detection algorithm. The controller 502 may be part of a control unit associated with an aircraft that includes the gas turbine engine 10.

The algorithm detects an impact event based on sensor inputs indicative of the speeds N1, N1T of the fan 402 and low pressure turbine stage 406 of the fan and turbine arrangement 400A, 400B shown in FIGS. 4A and 4B. The controller 502 receives a first signal S1 indicative of the speed of rotation N1 of the fan 402. The controller 502 further receives a second signal S2 indicative of the speed of rotation N1T of the low pressure turbine stage 406. The controller 502 further determines, based on the first signal S1 and the second signal S2, a difference metric ΔN representative of a difference between the speed of rotation N1 of the fan 402 and the speed of rotation N1T of the low pressure turbine stage 406.

The first and second signals S1, S2 may be generated by pre-existing sensors present in the gas turbine engine 10. Such sensors may already be present in the engine 10 because they are already used, for example, to evaluate operating parameters of the gas turbine engine 10. The system 500 may not, therefore, require the installation of any additional sensors/circuits for generating the first and second signals S1, S2. The controller 502 may receive the first and second signals S1, S2 by wired connections, wireless connections, or combinations thereof. The sensors may directly measure the speeds N1, N1T of the fan and turbine or the speeds may be indirectly measured, for example derived from other measured variables.

In this example the controller 502 includes a subtractor 510 that receives the first signal S1 and the second signal S2 and determines the difference metric ΔN by determining a difference between the fan speed signal N1 from the low pressure turbine speed N1T. Therefore, ΔN=|N1T−N1|. In some examples, the controller 502 may perform one or more signal filtering operations (e.g., time integration) on the first and second signals S1, S2 before determining the difference metric ΔN.

The controller 502 further determines whether the difference metric ΔN passes a threshold TH. The controller 502 includes a comparator 512 that receives the difference metric ΔN from the subtractor 510. The comparator 512 compares the difference metric ΔN with the threshold TH. If the difference metric ΔN exceeds the TH (i.e., ΔN>TH), the controller 502 may determine that a damage event has occurred. If the difference metric ΔN does not pass the threshold TH (i.e., $\Delta N<TH$), the controller 502 may further determine whether a non-damage event (the ingestion of ice, for example) has occurred based on whether the difference metric $\Delta N$ passes a second threshold (not shown in FIG. 5).

In some examples, the threshold TH is a predetermined threshold for a gas turbine engine type (e.g., a class/model of engine) corresponding to the gas turbine engine 10. The threshold TH may be adapted (from a baseline value, for example) based on one or more current operating conditions of the gas turbine engine 10. The current operating conditions may include cruise conditions, high thrust conditions, idling conditions, etc. The threshold TH may also be adapted based on an engine history of the gas turbine engine 10. The engine history may include a time duration of operation, prior shutdown/starting times, maintenance history, etc. which may affect the response of the lumped masses and shaft to a momentum exchange.

If the controller 502 determines that a damage event has occurred, the controller 502 may further determine an approximate impact energy associated with the damage event based on a magnitude of the difference metric $\Delta N$. In some examples, the controller 502 may approximate a size of an impact object associated with damage event based on the approximate impact energy.

The controller 502 may further categorise the damage event as one of a plurality of different possible types of damage event. The different types of damage event may include one or more foreign object damage events and/or one or more domestic object damage events. The one or more foreign object damage events may include a bird strike or another foreign object damage event. The one or more domestic object damage events may include the loss of a fan blade, a compressor blade or a turbine blade, for example.

Particular events, for example a bird strike, may be associated with a particular range of impact energies and size. Therefore, in some examples the categorisation may be based on the determined approximate impact energy and/or the determined approximate size of the object. The controller 502 may categorise the damage event as one of the plurality of different possible types of damage event based on a comparison of the difference metric $\Delta N$ (and/or impact energy) and a plurality of different thresholds corresponding to the different types of damage event. For example, if the difference metric $\Delta N$ crosses a first threshold but is less than a second threshold, the damage event may be categorised as a domestic object damage event such as the loss of a turbine blade. However, if the difference metric $\Delta N$ crosses both the first and second thresholds, the damage event may be categorised as a bird strike.

In some examples, the controller 502 may categorise the damage event as one of the plurality of possible types of damage events based on a degree to which the difference metric $\Delta N$ passes the threshold TH. For example, the controller 502 may categorise the damage event as a domestic object damage event if the difference metric $\Delta N$ is less than twice the threshold TH (i.e., $\Delta N<2TH$). The controller 502 may categorise the damage event as a bird strike event if the difference metric $\Delta N$ is greater than or equal to twice the threshold TH (i.e., $\Delta N \geq 2TH$).

As shown in FIG. 5, the comparator 512 generates an output signal 514. The output signal 514 may be indicative of whether a damage event has occurred. If a damage has occurred, the output signal 514 may further be indicative of the type of damage event. The output signal 514 may also include additional information, such as the approximate impact energy associated with the damage event, the size of the impact object associated with the damage event, the location of the impact associated with the damage event, etc.

In some examples, the output signal 514 may be indicative of a non-damage event if the difference metric $\Delta N$ does not passes the threshold TH. The controller 502 may further categorise the non-damage event as one of a plurality of types of non-damage event. Example of different types of non-damage event include ice accretion, ice shedding, hail, fan rotating stall, fan locked-in stall, fan flutter, fan forcing, rubbing between fan blades and a fan track liner, and engine vibrations not due to fan damage. The non-damage event may be categorised based on the magnitude of $\Delta N$, for example based on a comparison of $\Delta N$ to a plurality of thresholds, an approximate impact energy inferred from $\Delta N$, an impact location or any suitable combination as disclosed elsewhere herein.

In some examples the output signal 514 may be further processed. The output signal 514 may be processed so that a result of the determination is displayed on a display unit in a cockpit of the aircraft. Information related to a damage event or a non-damage event may be displayed to a flight crew via the display unit. An alert may also be generated based on the output signal 514. The alert may be a visual alert, an audio alert, a haptic alert, or combinations thereof. The output signal 514 may also be recorded for future access. For example, a ground crew may access the information related to the damage event or the non-damage event.

The system 500 of FIG. 5 may be robust to spurious detection during engine manoeuvres, such as slam acceleration and deceleration. The system 500 may therefore be less likely to provide false detections of damage events during normal engine operation. Thus, the output signal 514 of the system 500 may not require further processing, for example by the application of corrections using look-up tables. In this way fault, implementation of fault detection according to the present disclosure may be less complex compared to existing techniques.

Figure 6:
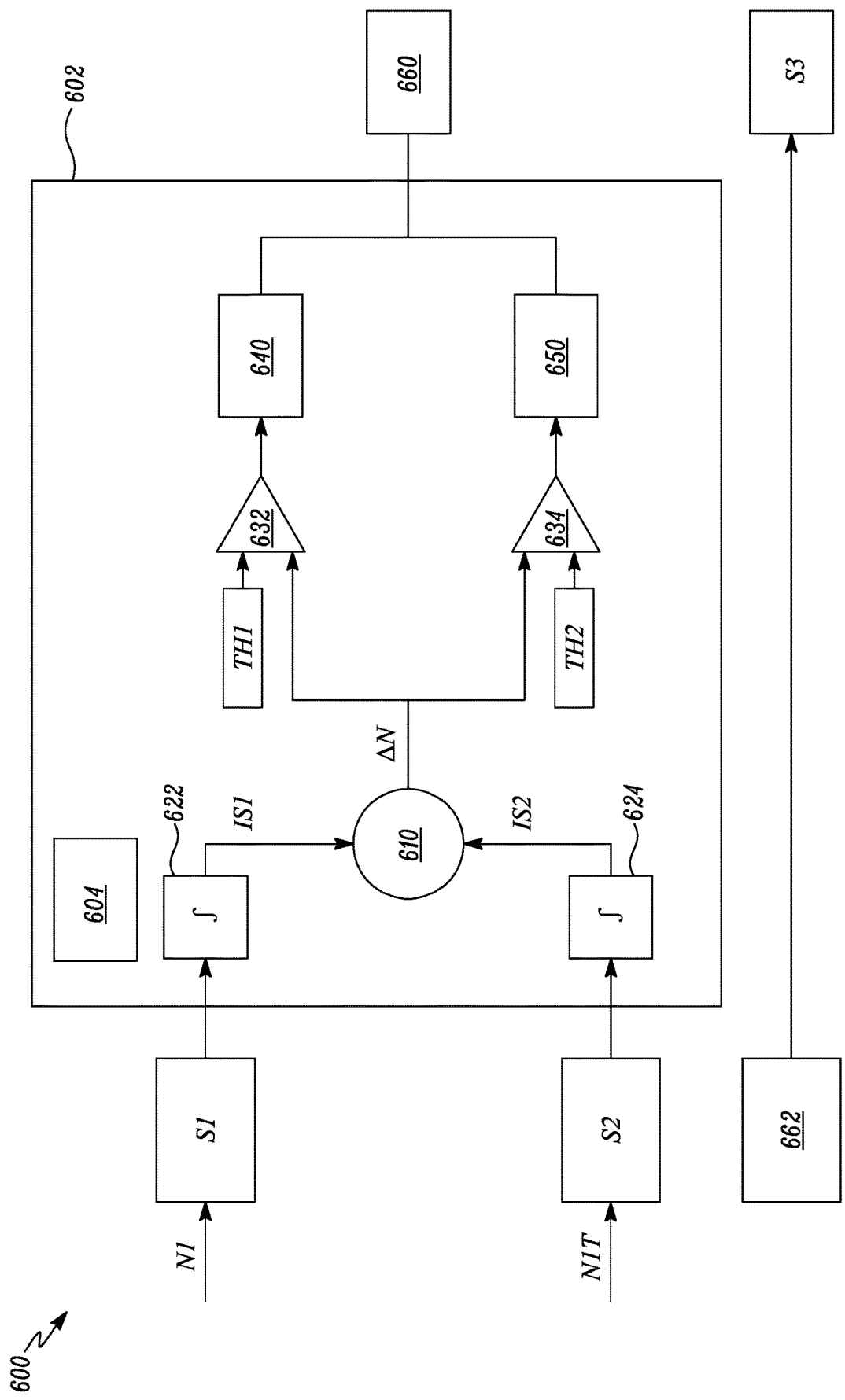
FIG. 6 is a schematic view of another system for detecting damage to a gas turbine engine.

FIG. 6 illustrates a system 600 for detecting damage to a gas turbine engine, for example, the gas turbine engine 10. The system 600 is similar to the system 500 of FIG. 5 and includes a controller 602. The controller 602 receives the first signal S1 indicative of the speed of rotation N1 of the fan 402 (shown in FIG. 4A). The controller 602 further receives the second signal S2 indicative of the speed of rotation N1T of the low pressure turbine stage 406 (shown in FIG. 4A).

Unlike the controller 502 of FIG. 5, the controller 602 includes a second comparator 634 in addition to the first comparator 632. Additionally, the controller 602 determines a difference metric $\Delta N$ based on a difference between time integrals of each of the first and second signals S1, S2. The integrals IS1, IS2 of the speed signals S1, S2 are related to the actual twist or torsion angles of the shaft 404 at the fan 402 and the lower pressure turbine stage, and a difference metric $\Delta N$ based on the time integrals may improve the robustness of the detection.

In this example, the controller 602 includes a first integrator 622 and a second integrator 624. The first integrator 622 time integrates the first signal S1 indicative of the speed of rotation N1 of the fan 402 to produce a first integrated signal IS1. The second integrator 624 time integrates the second signal S2 indicative of the speed of rotation N1T of the low pressure turbine stage 406 to produce a second integrated signal IS2. The subtractor 610 receives the first integrated signal IS1 and the second integrated signal IS2. The subtractor 610 then determines the difference between the first integrated signal IS1 and the second integrated signal IS2 to determine the difference metric ΔN (i.e., ΔN=|IS1−IS2|).

In the example illustrated in FIG. 6, the signals S1 and S2 are integrated prior to determining the difference between the signals IS1 and IS1. However, in other examples a difference between the two signals S1, S2 may be determined first and the difference between the signals integrated to form the difference metric ΔN.

The first comparator 632 receives the difference metric ΔN from the subtractor 610. The comparator 632 may then compare the difference metric ΔN with a first threshold TH1 for detecting a damage event. The controller 602 may determine that a damage event has occurred if the difference metric ΔN passes the first threshold TH1. The comparator 632 may then generate an output signal 640 indicating a damage event has occurred.

The second comparator 634 may receive the difference metric ΔN from the comparator 610. The second comparator 634 may then compare the difference metric ΔN with a second threshold TH2 for detecting a non-damage event. In some cases, the controller 602 may determine that a non-damage event has occurred if the difference metric ΔN passes the second threshold TH2 but does not pass the first threshold TH1. The second comparator 634 may then generate an output signal 650 indicative of the non-damage event.

In some examples, the output signal 640 from the first comparator 632 is combined with the output signal from the second comparator 634 to provide a combined output signal 660 of the controller 602. While FIG. 6 shows two comparators 632, 634 connected in parallel, it will be appreciated that they could be connected in series, or a single comparator could compare the difference metric ΔN to both of the thresholds TH1, TH2. The system 600 could also utilize any number of thresholds greater than two. The thresholds may correspond to different types of damage events and/or non-damage events.

The system 600 further includes an impact location detector 662 for detecting a location of an impact associated with an event. The impact location detector 662 may be a conventional location detector known in the art. The controller 602 may receive a third signal S3 from the impact location detector 662. The controller 602 may further categorize the event as one of a plurality of different possible types of damage event or non-damage events based at least in part on the location of the impact. For example, having determined that a damage event has occurred because ΔN passes the threshold TH1, the damage event may be categorized as a bird strike if the impact location is the fan and the impact energy or the magnitude of ΔN is within a predefined range associated with bird strikes. In an example, the combined output signal 660 may include information about the type of damage event. While not shown, the system 500 described above with reference to FIG. 5 could also include an impact location detector.

Figure 7:
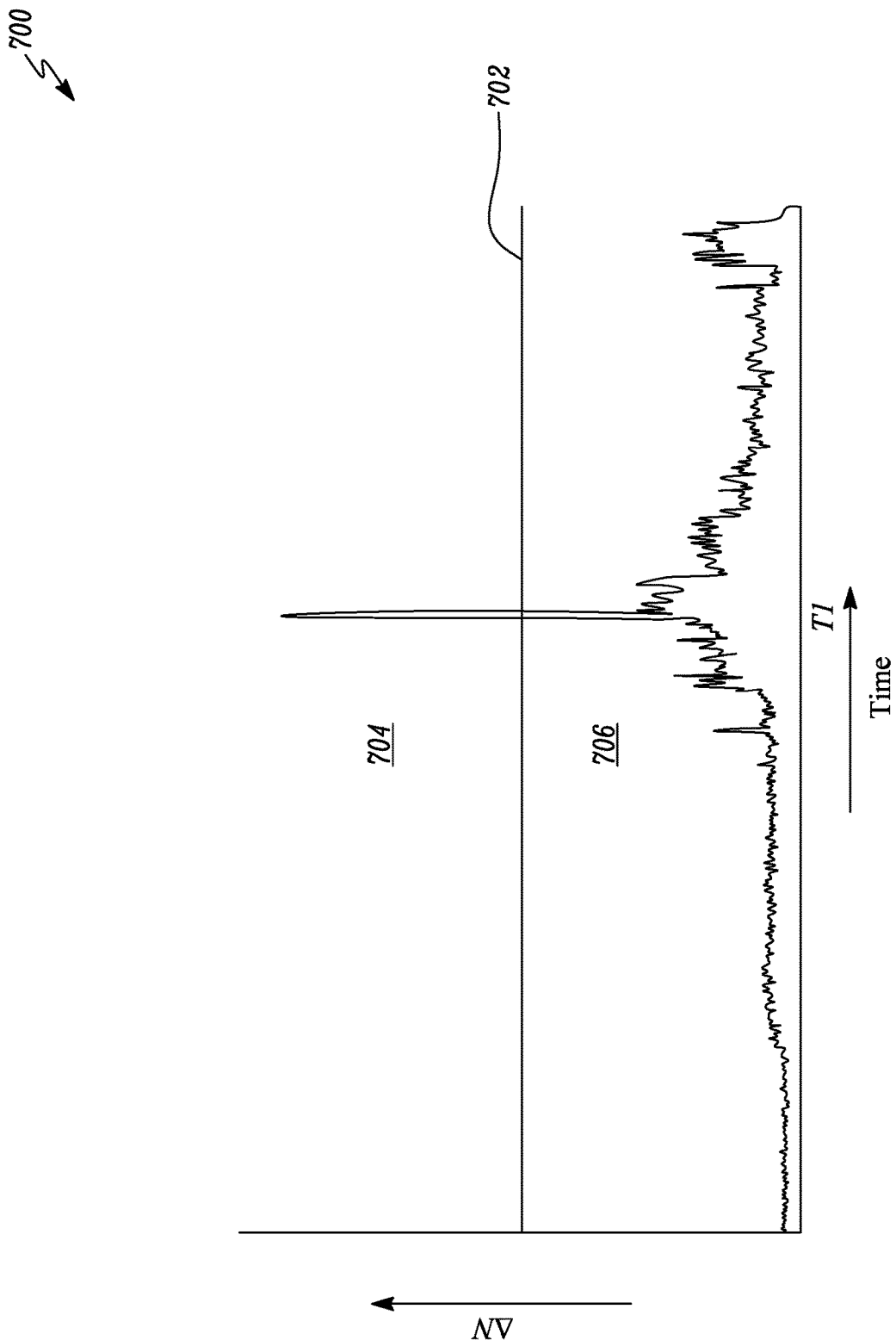
FIG. 7 is a graph illustrating a damage event.

FIG. 7 is a graph 700 depicting a time variation of the difference metric ΔN during a bird strike test. Time is shown along the ordinate (X-axis) and a magnitude of the difference metric ΔN is shown along the abscissa (Y-axis). A threshold 702 is shown in the graph 700 dividing the abscissa into two regions, i.e., a damage region 704 above the threshold 702 and a non-damage region 706 below the threshold 702. The systems 500, 600 of FIGS. 5 and 6 may determine that a damage event, in this case a bird strike, has occurred at time T1 because of a spike in the difference metric ΔN that passes the threshold 702 and enters the damage region 704.

The detection algorithm implemented by system 500 may be surprisingly robust against spurious detection associated with normal engine running manoeuvres. Specifically, unlike some techniques, the algorithm implemented by system 500 may not provide a false indication of a bird strike during normal engine operation. For example, in addition to the bird strike event at time T1, the test data shown in FIG. 7 includes several engine throttling events yet not of them results in a spike in ΔN that passes the threshold 702. Some existing detection techniques have been found not to be so robust and may require additional processing, filtering or even suspension to avoid false detections during normal operation.

The threshold 702 may be a fixed threshold, determined from modelling or empirical testing, for this specific engine or an engine of its type. The threshold 702 may have been adapted based on one or more current operating conditions of the gas turbine engine 10 and/or the engine history of the gas turbine engine 10. The threshold 702 may also be adapted to adjust a sensitivity of the system 500 to damage events.

Figure 8:
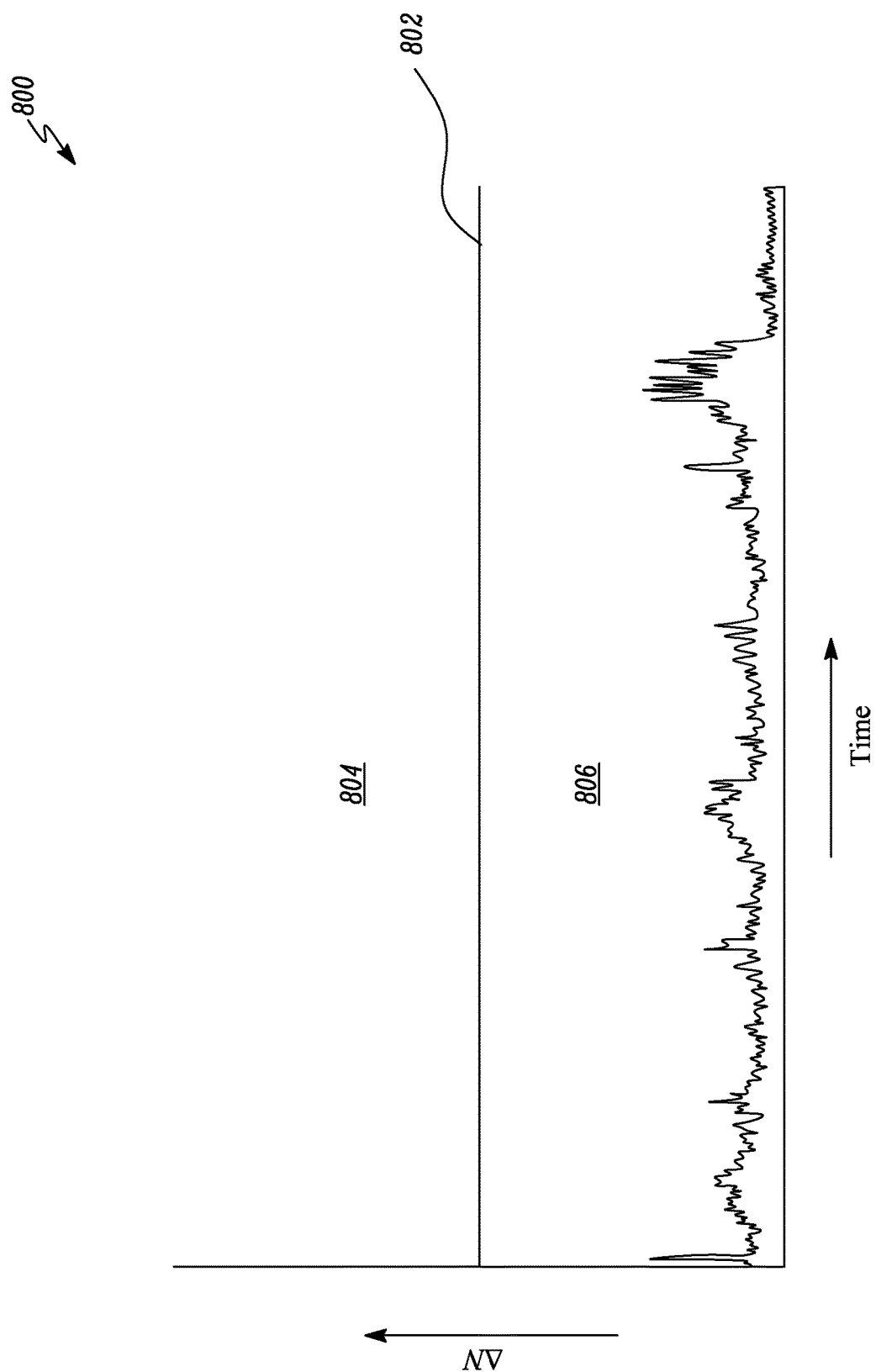
FIG. 8 is a graph illustrating a non-damage event.

FIG. 8 is a graph 800 depicting a time variation of the difference metric ΔN during an event that is known to correspond to ice accretion and shedding. Time is shown along the ordinate (X-axis) and a magnitude of the difference metric ΔN is shown along the abscissa (Y-axis). A threshold 802 is shown in the graph 800 dividing the abscissa into two regions, i.e., a damage region 804 above the threshold 802 and a non-damage region 806 below the threshold 802. The signal magnitude remains below the threshold 802, i.e., in the non-damage region 806 during ice accretion and shedding. The system 500 of FIG. 5 may therefore determine that no damage event has occurred during the time duration, with no false detection.

Figure 9:
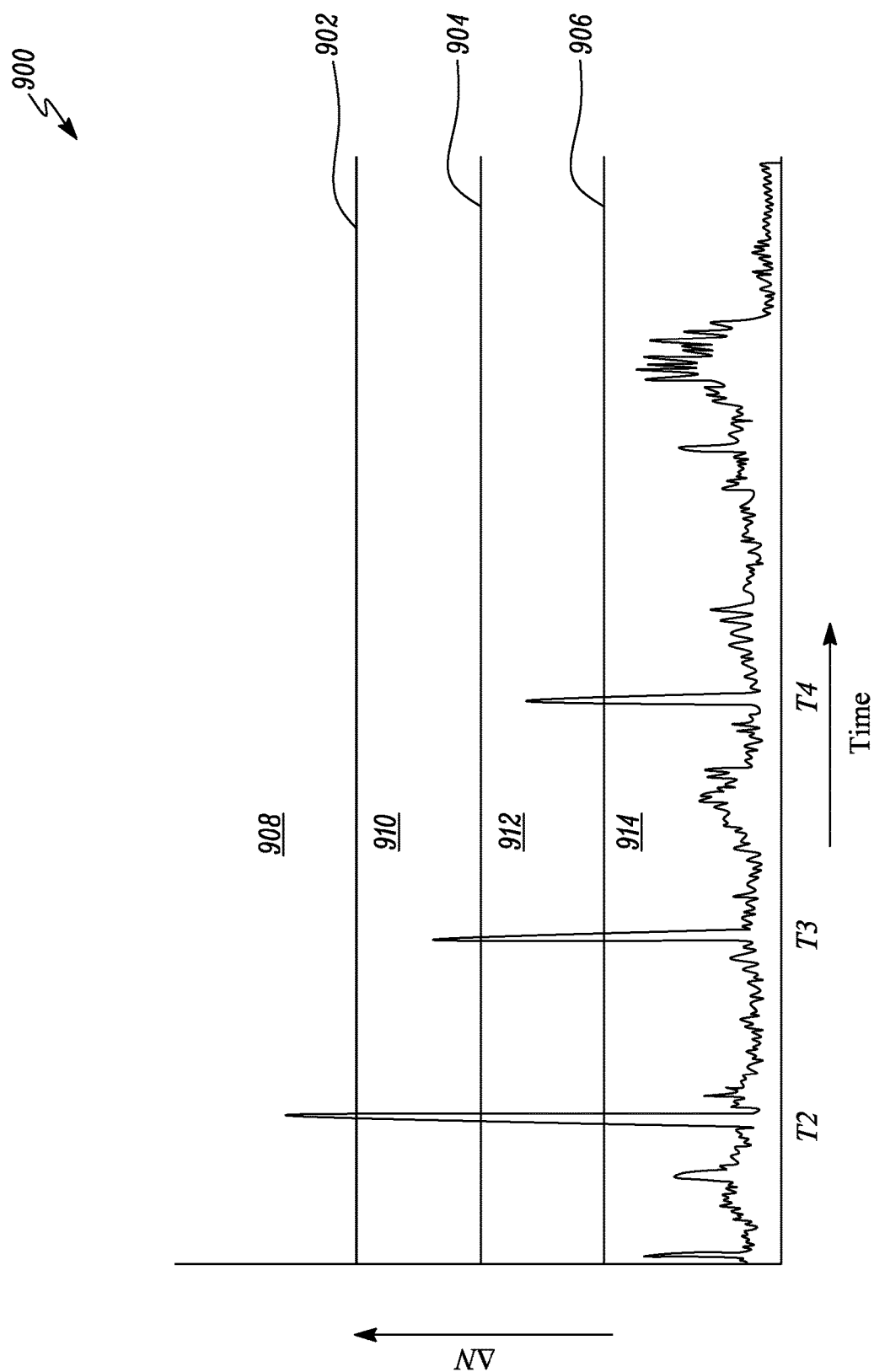
FIG. 9 is a graph illustrating different damage and non-damage events.

FIG. 9 is a graph 900 depicting a time variation of the difference metric ΔN during damage and non-damage events. Time is shown along the ordinate (X-axis) and the magnitude of ΔN is shown along the abscissa (Y-axis). A first threshold 902, a second threshold 904 and a third threshold 906 are shown in the graph 900. The first threshold 902 corresponds to a first type of damage event (e.g., a bird strike), the second threshold 904 corresponds to a second type of damage event (e.g., a domestic object damage event), and the second threshold 904 corresponds to a non-damage event (e.g., ice accretion and shedding). The first, second and third thresholds 902, 904, 906 divide the abscissa into four regions, i.e., a first damage region 908 above the first threshold 902, a second damage region 910 between the first and second thresholds 902, 904, a first non-damage region 912 between the second and third thresholds 904, 906, and a second non-damage region 914 below the third threshold 906.

The systems 500, 600 of FIGS. 5 and 6 may determine that a first type of damage event has occurred at time T2 when the signal magnitude passes the first threshold 902, i.e., crosses into the first damage region 908. The system 600 may further determine that a second type of damage event has occurred at time T3 when the signal magnitude passes the second threshold 904 but does not pass the first threshold 902. In other words, the signal magnitude lies between the first and second thresholds 902, 904. The system 600 may further determine that a first type of non-damage event has occurred at time T4 when the signal magnitude passes the third threshold 906 but does not pass the second threshold 904. In other words, the signal magnitude lies between the second and third thresholds 904, 906. Further, the system 600 may determine that the gas turbine engine 10 of FIG. 1 is operating normally when the signal magnitude does not pass the third threshold 906, i.e., lies in the second non-damage region 914.

The systems 500, 600 can therefore classify different types of damaging and non-damaging events based on the signal magnitude and multiple threshold ranges or regions. The threshold ranges can be adjusted as per application requirements.

Figure 10:
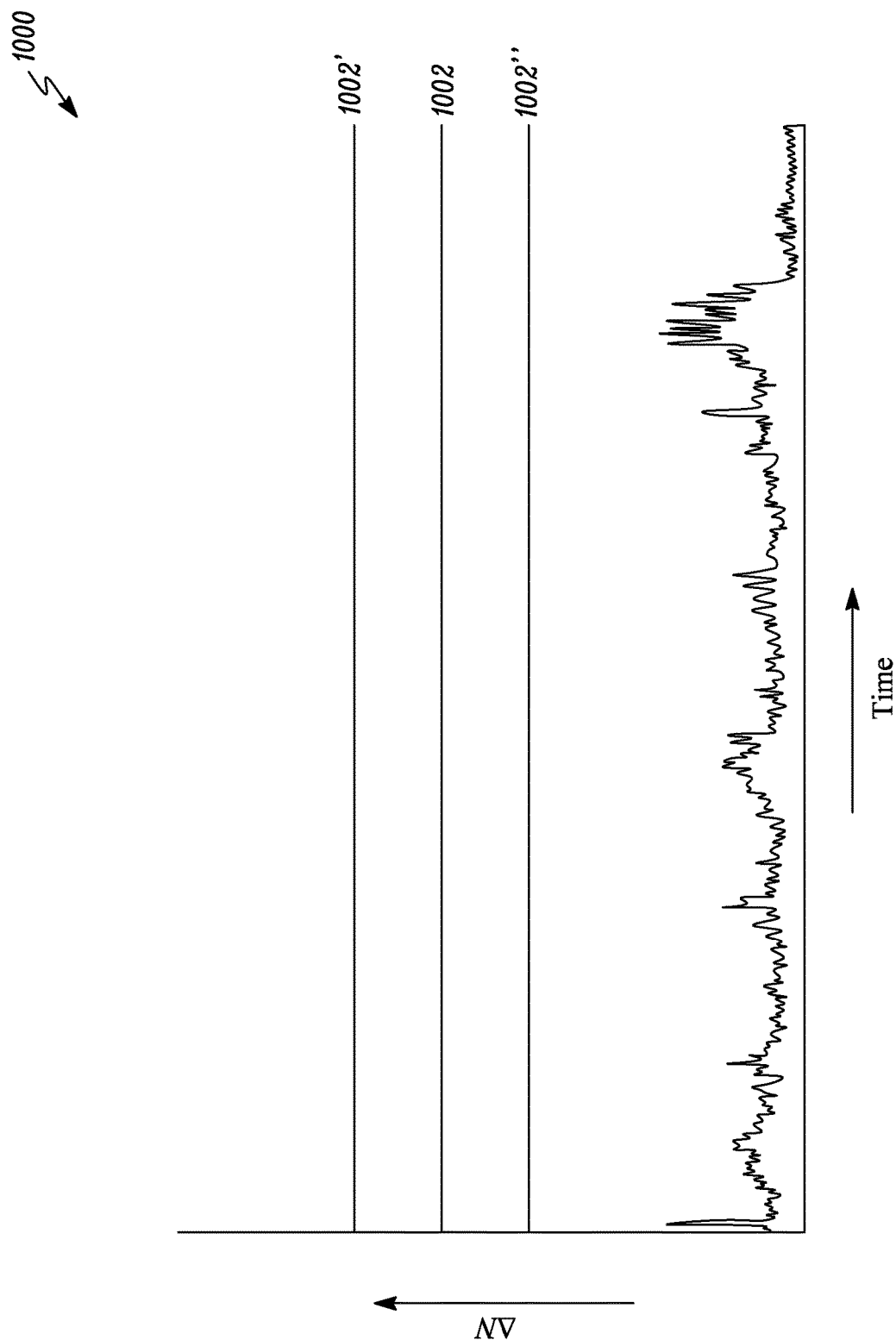
FIG. 10 is a graph illustrating a variable threshold.

FIG. 10 is a graph 1000 depicting a time variation of the difference metric $\Delta N$ during the non-damage event also shown in FIG. 8. Time is shown along the ordinate (X-axis) and a signal magnitude of the difference metric $\Delta N$ is shown along the abscissa (Y-axis). A threshold 1002 is shown in the graph 1000. FIG. 10 illustrates that the threshold 1002 can be adapted based on one or more current operating conditions of the gas turbine engine 10 and/or the engine history of the gas turbine engine 10. The threshold 1002 may correspond to cruise conditions of the aircraft including the gas turbine engine 10. In some examples, the threshold 1002 may be increased to a threshold 1002' during high thrust conditions of the aircraft, for example, during take-off. In some examples, the threshold 1002 may be decreased to a threshold 1002" during idling conditions of the aircraft. In some examples, the threshold 1002 may be progressively increased to the threshold 1002' as a total operational time of the gas turbine engine 10 increases. In some examples, the threshold 1002 may be progressively decreased to the threshold 1002" as a time period from a previous maintenance operation increases.

Figure 11:
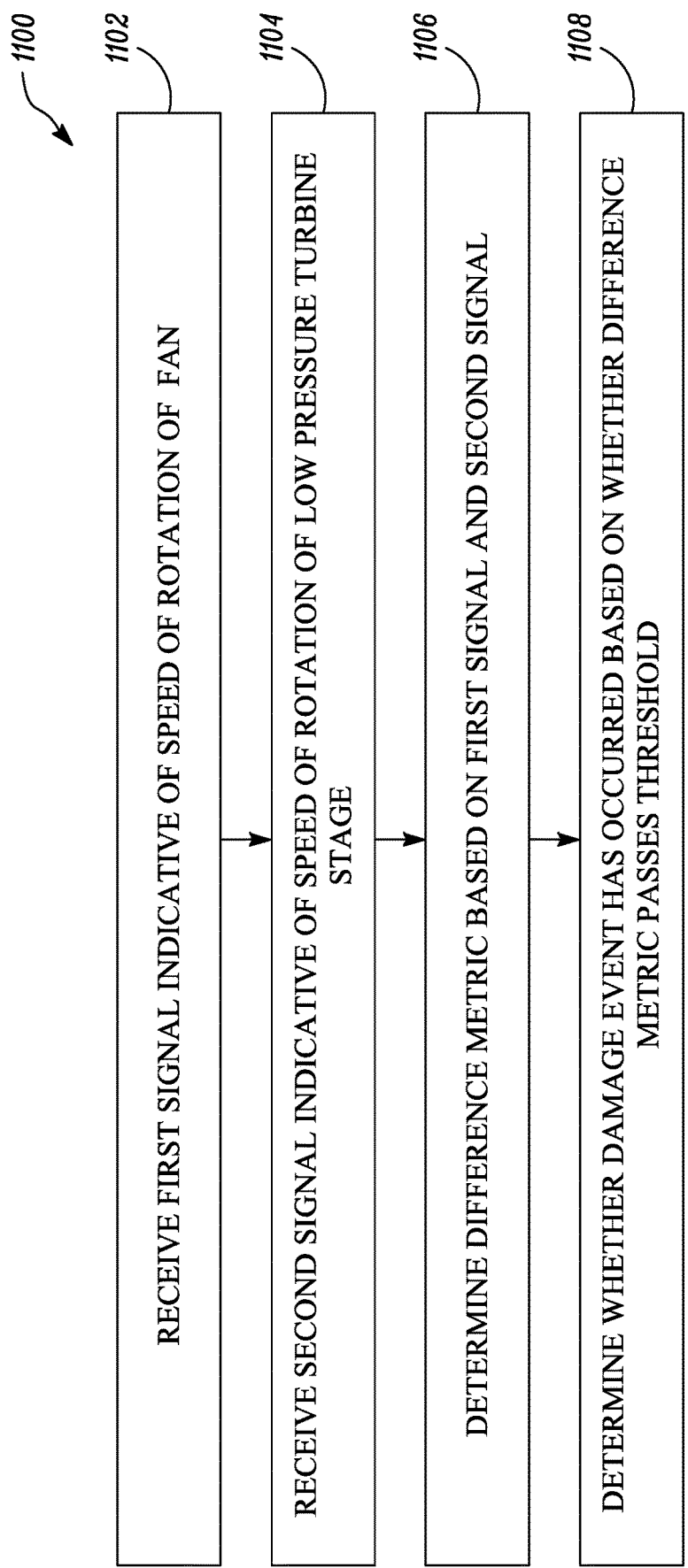
FIG. 11 is a flow chart of a method for detecting damage to a gas turbine engine.

FIG. 11 is a flow chart showing a computer-implemented method 1100 for detecting damage to a gas turbine engine, for example, the gas turbine engine 10. Reference will also be made to FIGS. 4A-B to 10. The method 1100 may be performed by the controller 502 of FIG. 5 or the controller 602 of FIG. 6.

The gas turbine engine 10 includes a fan 402 and a low pressure turbine stage 406. The fan 402 is drivably coupled to the low pressure turbine stage 406 by the shaft 404, possibly via a gearbox 408.

At 1102, the method 1100 includes receiving the first signal S1 indicative of the speed of rotation N1 of the fan 402. At 1104, the method 1100 further includes receiving the second signal S2 indicative of the speed of rotation N1T of the low pressure turbine stage 406. The speeds N1 and N1T may be directly measured or indirectly measured via measurement of another variable. The signals S1, S2 are indicative of the contemporaneous speeds N1, N1T of the fan and low pressure turbine. That is, the speeds N1, N1T of the fan and low pressure turbine are recorded at the same time. In some cases, the first and second signals S1, S2 may be buffered for calculation.

At 1106, the method 1100 further includes determining, based on the first signal S1 and the second signal S2, a difference metric $\Delta N$. The difference metric $\Delta N$ is representative of the difference between the speed of rotation N1 of the fan 402 and speed of rotation N1T of the low pressure turbine stage 406. The difference metric may be the difference |N1T−N1| between the two speeds or another metric that is a mathematical function of N1 and N1T that in some way represents the difference. In some examples the measured speeds N1T and N1 may be modified or normalized before their difference is taken, for example to take account of the effect of the gearbox 408 on the expected rotation speeds N1T, N1 during normal operation.

In some examples, determining the difference metric $\Delta N$ includes time integrating the difference |N1T−N1| or time integrating the first signal S1 indicative of the speed of rotation N1 of the fan 402 to produce the first integrated signal IS1; time integrating the second signal S2 indicative of the speed of rotation N1T of the low pressure turbine stage 406 to produce the second integrated signal IS2; and determining the difference (|IS1−IS2|) between the first integrated signal IS1 and the second integrated signal IS2.

At 1108, the method 1100 further includes determining whether a damage event has occurred based on whether the difference metric $\Delta N$ or $\Delta N$ passes the threshold TH or TH1, respectively.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A computer-implemented method for detecting damage to a gas turbine engine having a fan and a plurality of turbine stages including a low pressure turbine stage, the fan being drivably coupled to the low pressure turbine stage, the method comprising:
   receiving a first signal indicative of a speed of rotation of the fan;
   receiving a second signal indicative of a speed of rotation of the low pressure turbine stage;
   determining, based on the first signal and the second signal, a difference metric representative of a difference between the speed of rotation of the fan and the speed of rotation of the low pressure turbine stage;
   determining whether a damage event has occurred based on whether the difference metric exceeds a threshold; and
   determining an impact energy associated with the determined damage event based on a magnitude of the difference metric.

2. The method of claim 1, wherein determining the difference metric includes determining a difference between the speed of rotation of the fan and the speed of rotation of the low pressure turbine stage.

3. The method of claim 1, wherein determining the difference metric includes:
   time integrating the first signal indicative of the speed of rotation of the fan to produce a first integrated signal;
   time integrating the second signal indicative of the speed of rotation of the low pressure turbine stage to produce a second integrated signal; and
   determining a difference between the first integrated signal and the second integrated signal.

4. The method of claim 1, wherein the threshold is a predetermined threshold for a gas turbine engine type corresponding to the gas turbine engine.

5. The method of claim 1, wherein the threshold is adapted based on one or more current operating conditions of the gas turbine engine.

6. The method of claim 1, wherein the threshold is adapted based on an engine history of the gas turbine engine.

7. The method of claim 1, further comprising:
   approximating a size of an impact object associated with the damage event based on the determined impact energy.

8. The method of claim 1, further comprising:
   categorising the damage event as one of a plurality of different possible types of damage event based on the determined impact energy and/or the determined approximate size of the object.

9. The method of claim 1, further comprising:
receiving a third signal from an impact location detector indicating a location of an impact associated with the damage event; and
categorising the damage event as one of a plurality of different possible types of damage event based at least in part on the location of the impact.

10. The method of claim 1, further comprising:
categorising the damage event as one of a plurality of different possible types of damage event based on a comparison of the difference metric and a plurality of different thresholds corresponding to the plurality of different types of damage event.

11. The method of claim 1, further comprising:
categorising the damage event as one of a plurality of different possible types of damage event based on a degree to which the difference metric exceeds the threshold.

12. The method of claim 8, wherein the plurality of different types of damage event include one or more foreign object damage events and one or more domestic object damage events.

13. The method of claim 12, wherein the one or more foreign object damage events include a bird strike.

14. The method of claim 1, wherein, when the difference metric does not exceed the threshold, the method further comprises:
determining whether a non-damage event has occurred based on whether the difference metric exceeds a second threshold.

15. The method of claim 14, further comprising categorising the non-damage event as one of a plurality of types of non-damage event.

16. The method of claim 1, wherein the fan is drivably coupled to the low pressure turbine stage by a gearbox.

17. A non-transitory computer readable medium storing instructions which, when executed by one or more computers, causes the one or more computers to perform the method of claim 1.

18. A controller for an aircraft, the controller configured to perform the method of claim 1.

19. An aircraft comprising:
a gas turbine engine having a fan and a plurality of turbine stages including a low pressure turbine stage, the fan being drivably coupled to the low pressure turbine stage; and
the controller according to claim 18.

* * * * *